United States Patent [19]

Abraham

[11] Patent Number: 5,452,282
[45] Date of Patent: Sep. 19, 1995

[54] OPTICAL DATA STORAGE DISC

[76] Inventor: Nigel C. Abraham, 14C West Avenue, Gosforth Newcastle-upon-Tyne NE3 4EF, United Kingdom

[21] Appl. No.: 162,103

[22] PCT Filed: Jun. 15, 1992

[86] PCT No.: PCT/GB92/01073
§ 371 Date: Jan 21, 1994
§ 102(e) Date: Jan. 21, 1994

[87] PCT Pub. No.: WO92/22894
PCT Pub. Date: Dec. 23, 1992

[30] Foreign Application Priority Data

Jun. 13, 1991 [GB] United Kingdom ............... 9112791

[51] Int. Cl.$^6$ ............................................. G11B 7/00
[52] U.S. Cl. .................................. 369/603; 369/273; 369/292; 430/1; 430/321; 359/1; 359/12
[58] Field of Search ............... 369/103, 273, 292; 430/320, 321, 1, 2, 39; 264/1.14; 365/457; 359/1, 12

[56] References Cited

U.S. PATENT DOCUMENTS

| | | | |
|---|---|---|---|
| 4,329,575 | 5/1982 | Roach | 369/273 |
| 4,641,017 | 6/1987 | Lopata | 235/457 |
| 4,724,043 | 2/1988 | Bergendahl et al. | 430/321 |
| 4,943,126 | 7/1990 | Lang et al. | 365/125 |
| 4,945,215 | 7/1990 | Fukushima et al. | 235/457 |
| 5,051,340 | 9/1991 | Tyran et al. | 430/321 |
| 5,059,499 | 10/1991 | Teitel | 359/22 |
| 5,138,604 | 8/1992 | Umeda et al. | 369/203 |
| 5,291,006 | 3/1994 | Nishiguma et al. | 235/457 |

FOREIGN PATENT DOCUMENTS

| | | |
|---|---|---|
| 0326437 | 8/1989 | European Pat. Off. |
| 0374256 | 6/1990 | European Pat. Off. |
| 371383 | 3/1991 | Japan ............... 235/457 |

*Primary Examiner*—David C. Nelms
*Assistant Examiner*—Tan Nguyen
*Attorney, Agent, or Firm*—Edwin D. Schindler

[57] ABSTRACT

A process for producing an optical data storage disc (e.g., a compact disc) carrying a digital recording and also carries a holographic image is disclosed. The holographic recording occupies an area (14) separate from the area (12) occupied by the digital recording, for example, the holographic recording may be positioned in an annular area encircling the central area occupied by the digital recording.

3 Claims, 2 Drawing Sheets

OPTICAL DATA STORAGE DISC

BACKGROUND OF THE INVENTION

This invention relates to an optical data storage disc and particularly but not solely to an optical data storage disc in the form of a compact disc (CD) which carries an audio recording. The invention also relates to a method of manufacturing such optical data storage discs.

In forming recorded compact discs, firstly the digital information, primarily audio, is recorded onto a master disc by forming the surface of the master disc with pits of varying circumferential lengths, but uniform width and depth. These pits are formed by selectively exposing a surface coating on the disc with a laser beam, typically using a blue line such as the 457.9 nm line from an Argon laser. Typically the surface coating comprises a high resolution positive photoresist, formed on a glass substrate. The areas which are exposed by the laser beam are developed using a caustic developer solution which removes the photoresist coating over those areas. The depth of the pits thus formed by the developer is normally in the range 0.1 to 0.2 microns. The exposed and developed master disc then has a thin layer of silver deposited onto the pits, normally by vacuum deposition although spray silvering and other techniques may be used. The master disc is then placed in an electroforming tank, where a layer of nickel is formed over the silver layer. The master disc is then put through a number of stages, known in the art, to produce a nickel stamper. This stamper is then applied to polycarbonate blank discs, either by pressing or vacuum forming, and the polycarbonate discs then receive a layer of aluminium and a protective coating of lacquer, which is subsequently printed upon. The process thus provides compact discs in playable form.

In forming embossed holograms, a positive photoresist coated on a glass substrate is exposed using a blue line from a laser. The process comprises recording an interference pattern between two or more wavefronts of laser light, created under extremely stable conditions and normally on an isolation table. The interference pattern, or interference fringes, provide light and dark areas, often with complex nuances which, when developed, redirect light to produce three dimensional images or other effects. The interference fringes which are recorded are often of 0.3 microns or less in depth and have a pitch normally in the range of 0.5 microns to 5 microns. In forming a holographic recording the photoresist is partially exposed over all of its area, with different regions receiving different levels of exposure involving complex phase relationships. Because of this, and also because the diffraction efficiency is reduced if the photoresist is removed right down to the substrate, generally a relatively thick photoresist coating is used, typically 1 to 2 microns thick. Also a developer is chosen which brings out the subtleties of exposure, rounding the edges of the pits to an extent which would be excessive for digital information, which requires pits with very sharp edges. The exposed and developed master is then subjected to electroforming etc. and a nickel stamper is produced, generally as for the compact disc master, and holograms can be formed by pressing or injection moulding in much the same way as for compact discs.

SUMMARY OF THE INVENTION

It will be appreciated from the foregoing that the considerations required for producing optical data storage discs with high quality digital e.g. audio recordings, are quite different from and incompatible with the considerations required for producing holograms with high quality optical recordings.

However, we have now devised an optical storage disc which carries both a digital recording and a hologram, and we have devised a method of manufacturing such discs.

Thus, in accordance with this invention, there is provided an optical data storage disc carrying a digital recording and also carrying a holographic recording.

Typically the optical storage disc carries a digital audio recording, primarily music, and is in the form of a compact disc (CD).

In the case of a CD single, the audio recording may extend radially outwards to a diameter of 70 to 80 mm, for example, (giving a playing time of 15 to 20 minutes) the remaining metallised area (out to approximately 118 mm) being free to carry the holographic recording or image.

Also in accordance with this invention, there is provided a method of manufacturing optical data storage discs which carry a digital recording and also a holographic image, the method comprising the steps of producing a master carrying a digital recording and a holographic recording, and replicating optical data storage discs from the master.

In one embodiment, the step of producing the master comprises the steps of forming a digital recording and a holographic recording on the master in successive optical exposures.

In another embodiment, the step of producing the master comprises the steps of forming a digital recording and a holographic recording on separate substrates, then forming corresponding recordings on the master from the recordings on the separate substrates.

BRIEF DESCRIPTION OF THE DRAWINGS FIGURES

Embodiments of this invention will now be described by way of examples only and with reference to the accompanying drawings, in which.

DETAILED DESCRIPTION OF THE DRAWING AND PREFERRED EMBODIMENTS

Figure 1:
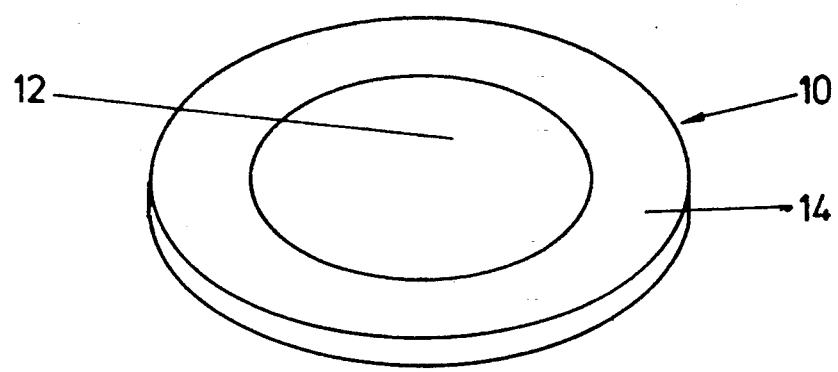
FIG. 1 shows an optical data storage disc in according with this invention.

Referring to FIG. 1 of the drawings, there is shown an optical data storage disc 10, in the form of a compact disc, carrying a digital audio recording in a central area 12, and a hologram in a surrounding annular area 14.

In accordance with the invention, the optical data storage discs are manufactured by firstly producing a master which carries both a digital recording and a holographic recording, and then replicating the optical data storage discs from this master: the replication process comprises impressing blank discs with a stamper formed from the master, or injection moulding discs in a mould having one side formed by the stamper.

The digital and holographic recordings are made by optically exposing a photoresist coating, which is then developed and further processed as generally discussed above. The photoresist coating may be relatively thin (e.g. 0.1 to 0.2 microns) over the area to receive the digital information, and substantially thicker (e.g. 1 and 2 microns) over the area to receive the holographic information.

Alternatively the photoresist coating may be relatively thin (e.g. 0.1 to 0.2 microns) over its entire area: in order to form satisfactory holograms with such thin photoresist coatings, selected techniques may be adopted. For this, efficient methods of hologram exposure in accordance with this invention include digital types, e.g. a pure holographic diffraction grating or variations such as dot matrix or diffuse information but without intensity variations. This type of holographic effect is least affected by the thinner coatings required for CD masters.

A preferred method of this invention involves the use of dot matrix holograms (as described in European patent application No. 91306316.0) which produces individual tiny "pixelated" holographic diffraction gratings which can be manipulated in a number of ways. One method involves rotating the gratings around an axis, under computer control, which when using current software gives 255 different possible angles.

One advantage of using dot matrix holograms is that, being single diffraction units, they are particularly efficient (optically bright), and this is particularly important here as the photoresist thickness is well below optimum. The thin layer also means the exposure latitude is greatly reduced, although each dot being the sample exposure makes this problem easier to control. This method is also extremely versatile as not only can the size and the angle of the dot be controlled, but also the angle between the two laser beams which produce the option of colour control. Further, if the two beams cease to be collinated and become one of various combinations of collinated, converging and diverging beams, mini zone plates can be produced, which gives the possibility of a 3D dot matrix. An alternative way of producing a 3D dot matrix is to control the angles or colours at one position, to give a dot matrix stereo pair (i.e. a view for the left eye and a view for the right eye). However, to enhance the holographic part of the recording it may be possible to locally increase the thickness of the photoresist coating on the master without detriment to the digital signal quality.

Figure 2:
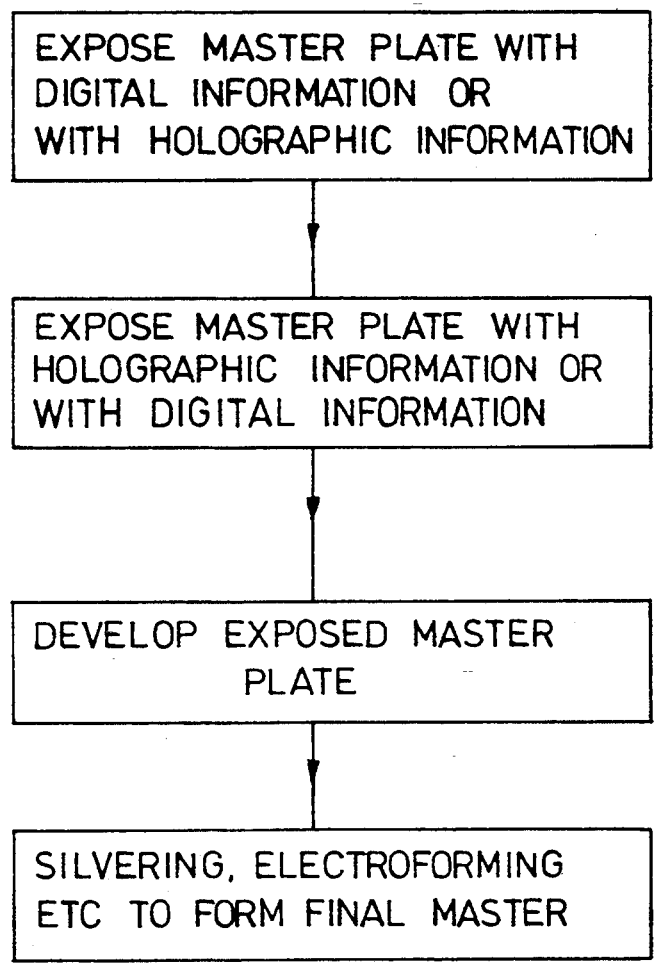
FIG. 2 is a diagram to explain the steps in one method of manufacturing optical data storage discs in according with this invention.

Referring to FIG. 2, in a two-stage exposure technique, the radially inner part of a photoresist coating on a master plate is exposed with the digital information (pit information) before or after the outer area is exposed with the holographic dot matrix: the dot size can be altered to provide a tone effect (and this is particularly useful in transferring photographs or other continuous tone images into holographic images). In this case the photoresist is typically 0.1 to 0.2 microns thick. After both exposures, the master is taken through the developing, silvering, and electroforming etc. stages as described previously, and a nickel stamper is produced and used to form playable compact discs having bright holographic images over a ring or annulus encircling the central, audio recording area.

The operating parameters of the replicating process (including injection speed and pressure, hold-on pressure and melt temperature) can be varied to ensure that a bright hologram is yielded, without detriment to the quality of the signals produced when replaying the digital information.

Figure 3:
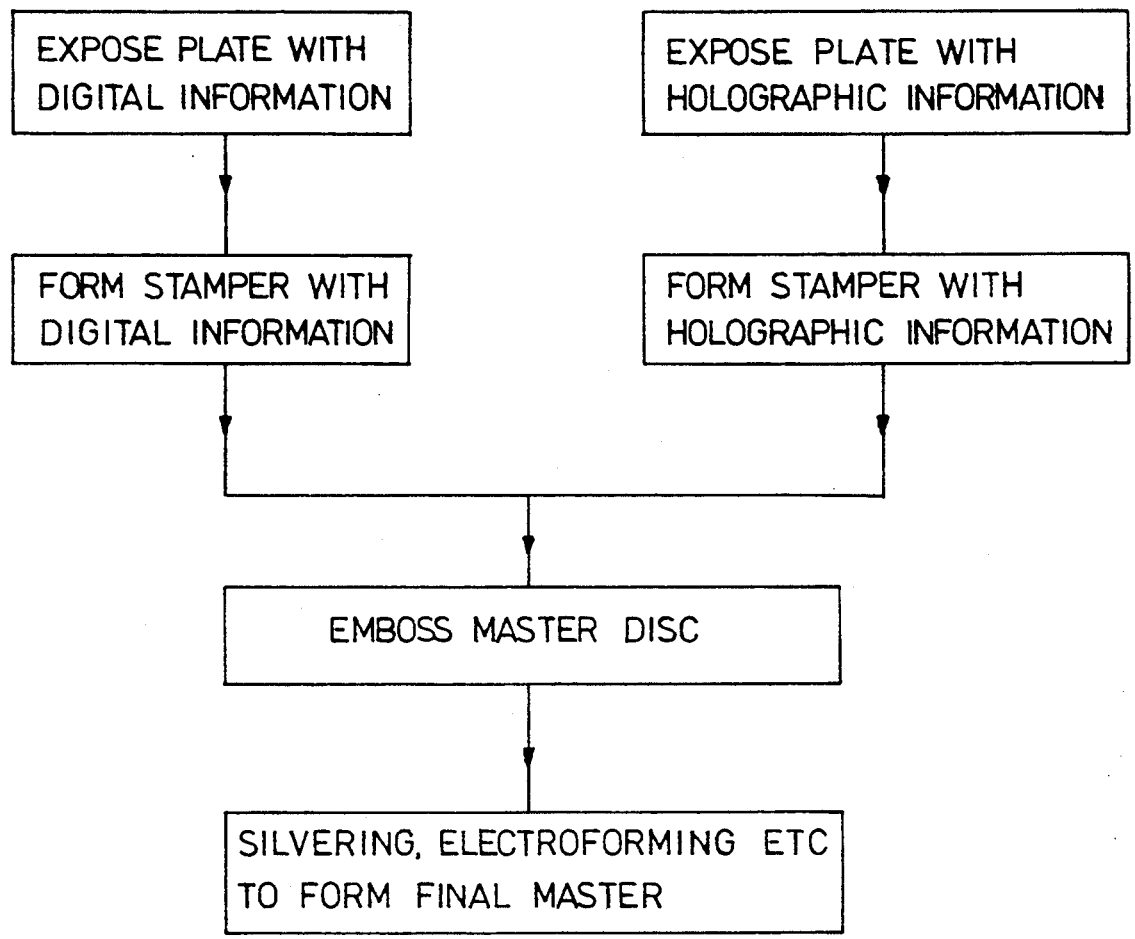
FIG. 3 is a diagram to explain the steps in an alternative method of manufacturing optical data storage discs in accordance with this invention.

Referring to FIG. 3, in an alternative method of production, digital information and holographic images are recorded separately on separate plates, in which the respective parameters (e.g. photoresist thickness, processing techniques and developers) are optimised. Separate nickel stampers are produced for the separate plates, and used to emboss a master disc with the digital recording over its central area and the holographic image around the outside. The master disc may comprise a rigid substrate (e.g. acrylic) coated with an embossable material (e.g. a thermoplastic lacquer). The embossing steps require very clean conditions and extreme precision, to preserve the quality of the digital recording. The master is then processed (e.g. silvered and electroformed etc) to form a single stamper, from which compact discs (with holographic images) can be replicated.

It will be appreciated that whilst the production has been described of compact discs having an annular area with a holographic image surrounding a central area with a digital recording, instead the holographic image may be carried in a discrete area, e.g. to provide a label or security feature; in this case the digital recording may provide a full length playing time.

I claim:

1. A method for manufacturing optical data storage discs which carry a digital recording and a holographic image, said method comprising the steps of:

producing a master by a process comprising the steps of forming a digital recording and a holographic recording on said master in successive optical exposures so that the same said master carries both the digital recording and the holographic recording; and, replicating optical data storage discs from said master, said optical data storage discs thereby carrying both said digital recording and said hologram which, upon replay under incident light, will produce a visible image.

2. A method for manufacturing optical data storage discs which carry a digital recording and a holographic image, said method comprising the steps of:

producing a master by a process comprising the steps of forming a digital recording and a holographic recording on separate substrates and then forming corresponding recordings on said master from the recordings on the separate substrates so that said master carries the digital recording and the holographic recording; and, replicating optical data storage discs from said master.

3. A method for manufacturing optical data storage discs which carry a digital recording and a holographic image, said method comprising the steps of:

producing a master by a process comprising the steps of forming a digital recording and a holographic recording on separate substrates and then forming corresponding recordings on said master from the recordings on the separate substrates so that the same said master carries both the digital recording and the holographic recording; and, replicating optical data storage discs from said master, said optical data storage discs thereby carrying both said digital recording and said hologram which, upon replay under incident light, will produce a visible image.

* * * * *